US009623909B1

(12) United States Patent
Hirano et al.

(10) Patent No.: US 9,623,909 B1
(45) Date of Patent: Apr. 18, 2017

(54) SUBFRAME STRUCTURE

(71) Applicant: HONDA MOTOR CO., LTD., Tokyo (JP)

(72) Inventors: Masataka Hirano, Wako (JP); Tetsuya Miyahara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/941,968

(22) Filed: Nov. 16, 2015

(30) Foreign Application Priority Data

Nov. 17, 2014 (JP) ................. 2014-232477

(51) Int. Cl.
B60K 5/12 (2006.01)
B62D 21/11 (2006.01)

(52) U.S. Cl.
CPC .................... B62D 21/11 (2013.01)

(58) Field of Classification Search
CPC ...... B60K 5/12; B60K 5/1208; B60K 5/1216; B60K 5/1225; B60K 5/1275; B62D 21/11; B62D 25/082
See application file for complete search history.

(56) References Cited

U.S. PATENT DOCUMENTS

| 4,456,213 | A | * | 6/1984 | Fukushima | F16F 7/108 248/559 |
| 5,133,427 | A | * | 7/1992 | Arvidsson | B60K 5/1216 180/297 |
| 6,460,822 | B1 | * | 10/2002 | Lee | B60K 5/1208 248/635 |
| 7,040,446 | B2 | * | 5/2006 | Anzai | B60K 5/1275 180/234 |
| 7,575,088 | B2 | * | 8/2009 | Mir | B60K 17/00 180/297 |
| 2002/0096384 | A1 | * | 7/2002 | Yoshida | B60K 5/12 180/298 |
| 2002/0166711 | A1 | * | 11/2002 | Witherspoon | B60K 5/1216 180/291 |
| 2012/0267184 | A1 | * | 10/2012 | Joly | F16F 1/373 180/291 |
| 2013/0068552 | A1 | * | 3/2013 | Kim | B60K 5/1216 180/300 |

FOREIGN PATENT DOCUMENTS

JP 2000-238545 A 9/2000

* cited by examiner

Primary Examiner — Brian Swenson
(74) Attorney, Agent, or Firm — Westerman, Hattori, Daniels & Adrian, LLP

(57) ABSTRACT

A subframe structure includes an attachment bracket that is disposed between the second vibration-isolation device and rear cross member and that attach the second vibration-isolation device to the rear cross member, and four elastic bushings that floatably support the attachment bracket as to the rear cross member at four support points. A load input point where a load is input from an engine to the second vibration-isolation device is positioned within a region surrounded by the four support points in planar view.

3 Claims, 14 Drawing Sheets

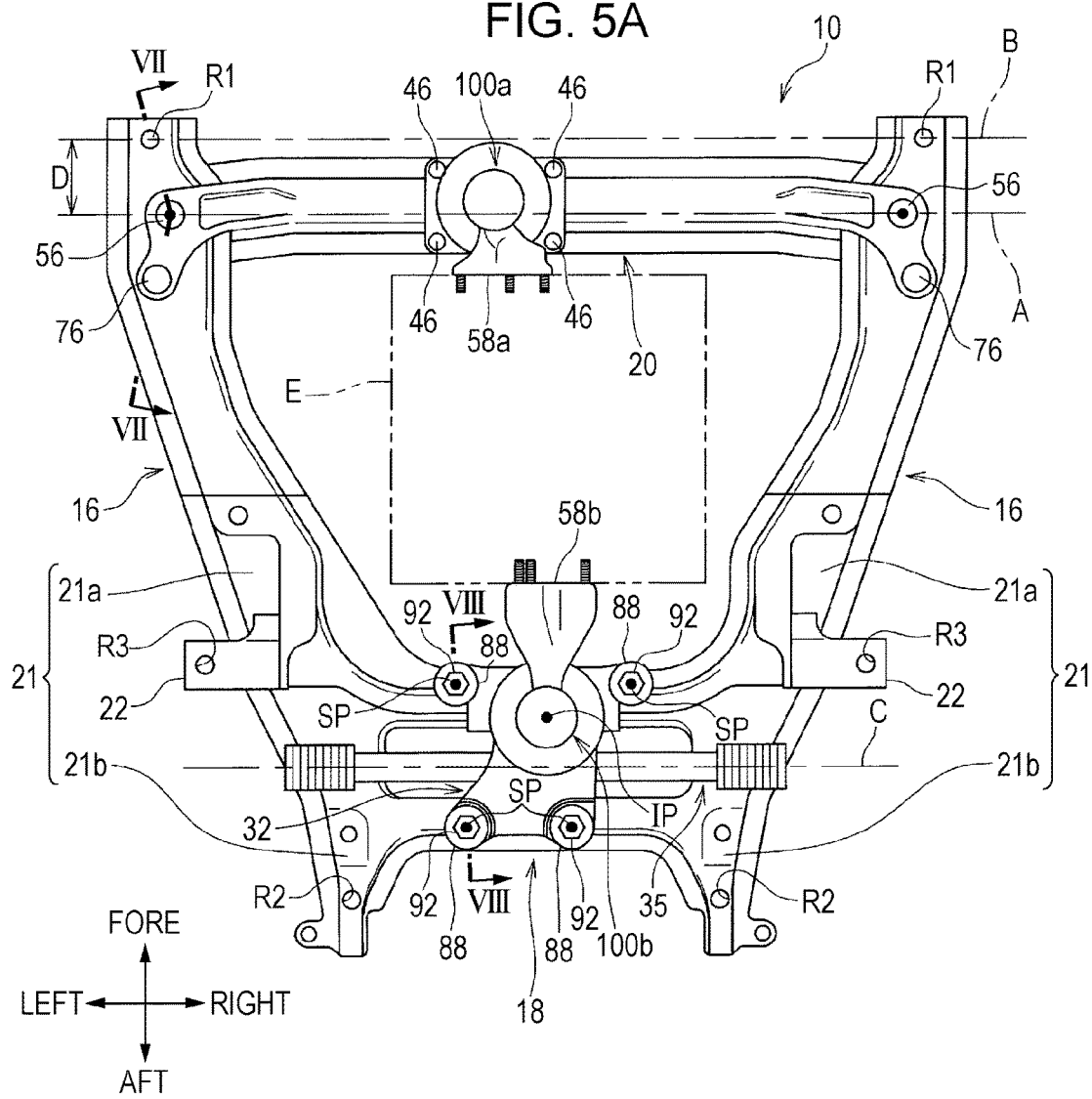
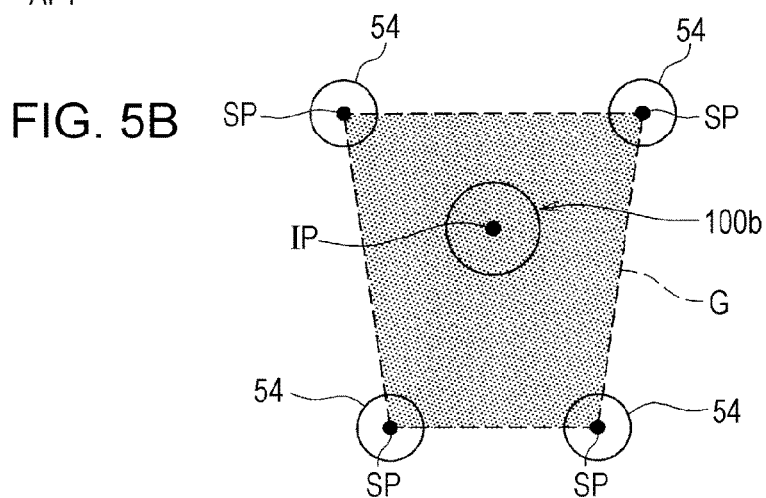

FIG. 10
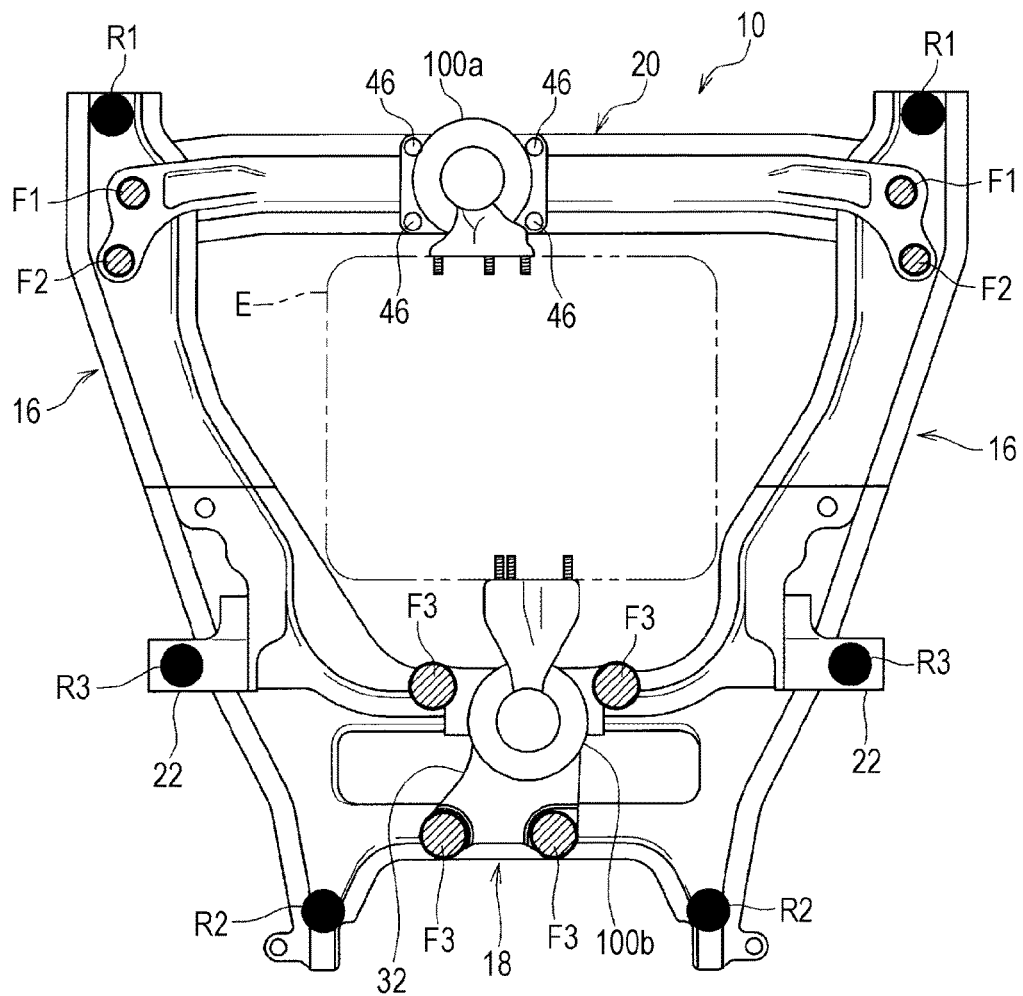
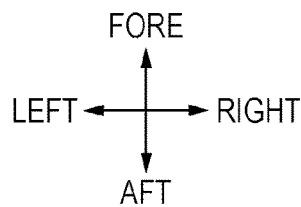
● FIXED POINTS (RIGID)
◐ FLOATING POINTS

SUBFRAME STRUCTURE

CROSS REFERENCES TO RELATED APPLICATIONS

The present application claims priority under 35 U.S.C. §119 to Japanese Patent Application No. 2014-232477, filed Nov. 17, 2014, entitled "Subframe Structure." The contents of this application are incorporated herein by reference in their entirety.

BACKGROUND

1. Field

The present disclosure relates to a subframe structure of a vehicle.

2. Description of the Related Art

Vehicles such as automobiles and the like are provided with a subframe that is fixed to front side frames serving as a body frame. Suspension components such as suspension arms, stabilizers, and so forth, are attached to the side frames for example, and the subframe also supports the power plant for the vehicle, such as an engine and/or electric motor or the like, via a vibration-isolation device.

For example, Japanese Unexamined Patent Application Publication No. 2000-238545 discloses a rubber vibration-absorbing elastic member 1 that absorbs vibrations occurring in a body, as illustrated in FIG. 14. This vibration-absorbing elastic member 1 is configured including two cylindrical elastic bodies 2a and 2b and metal discs 3a and 3b mounted on the lower side of the two elastic bodies 2a and 2b. Reference numeral 4 in FIG. 14 denotes left and right brackets, 5 denotes a cross-member, and 6 denotes stud bolts fixing the vibration-absorbing elastic members 1 to the cross-member 5.

In a case where the vibration-absorbing elastic member 1 disclosed in Japanese Unexamined Patent Application Publication No. 2000-238545 is disposed on the subframe, vibrations generated by the power plant for the vehicle such as the engine can be can be reduced, but there is demand for more effective reduction of vibrations.

SUMMARY

The present application describes a subframe structure capable of further improving vibration isolation as compared to the related art.

According to an aspect of the present disclosure, a subframe structure, that includes a longitudinal member extending in a longitude direction of a vehicle and a lateral member extending in a lateral direction of the vehicle and is supported by a body frame, includes: a vibration-isolation device that is disposed on the lateral member and supports a vehicular power plant; an attachment bracket that is disposed between the vibration-isolation device and the lateral member, and that attaches the vibration-isolation device to the lateral member; and a plurality of elastic members that floatably support the attachment bracket as to the lateral member at a plurality of support points. A load input point, where a load is input to the vibration-isolation device from the vehicular power plant, is positioned within a range surrounded by the plurality of support points in planar view.

According to this configuration, even if the subframe is rigidly attached to the body frame, the load input point (IP) is arranged to be positioned within a region (G) surrounded by multiple support points (SP) in planar view. Due to this arrangement, excessive vibrations in the longitude direction of the vehicle that are input from the load input point (IP), and excessive vibrations in the lateral direction of the vehicle, are absorbed at the multiple support points (SP). Accordingly, excessive vibrations in the longitude direction of the vehicle and excessive vibrations in the lateral direction of the vehicle are kept from being added to the vibrations in the vertical direction of the vehicle input from the load input point IP. As a result, the vibration-shielding region by the vibration-isolation device can be extended, and vibration isolation effects can be improved over the related art even further.

On the other hand, in a case where the load input point (IP) is situated outside of the region (G) surrounded by the support points (SP), excessive vibrations in the longitudinal direction of the vehicle and excessive vibrations in the lateral direction of the vehicle are added to the vibrations in the vertical direction of the vehicle input from the load input point (IP), so extending the vibration-shielding region by the vibration-isolation device becomes difficult.

The attachment bracket may have an accommodation recess formed between itself and the lateral member, a steering gearbox being disposed within the accommodation recess.

According to this configuration, the steering gearbox can be suitably disposed using the accommodation recess formed in the attachment bracket. As a result, the scant space at the front of the vehicle where the vehicular power plant is accommodated can be used efficiently, and freedom of layout within the space can be improved.

Attachment portions to which suspension arms are attached are provided on both ends of the lateral member in the lateral direction of the vehicle.

According to this configuration, providing attachment portions on both ends of the lateral member in the lateral direction of the vehicle secures space to attach suspension arms.

BRIEF DESCRIPTION OF THE DRAWINGS

FIG. 5A is a planar view of the subframe structure illustrated in FIG. 3.

FIG. 5B is a planar schematic view illustrating the positional relation between a load input point and four support points.

FIG. 10 is a planar schematic diagram illustrating the positional relationship between fixed points and floating points in the subframe structure illustrated in FIG. 3.

DESCRIPTION OF THE PREFERRED EMBODIMENTS

Figure 1:
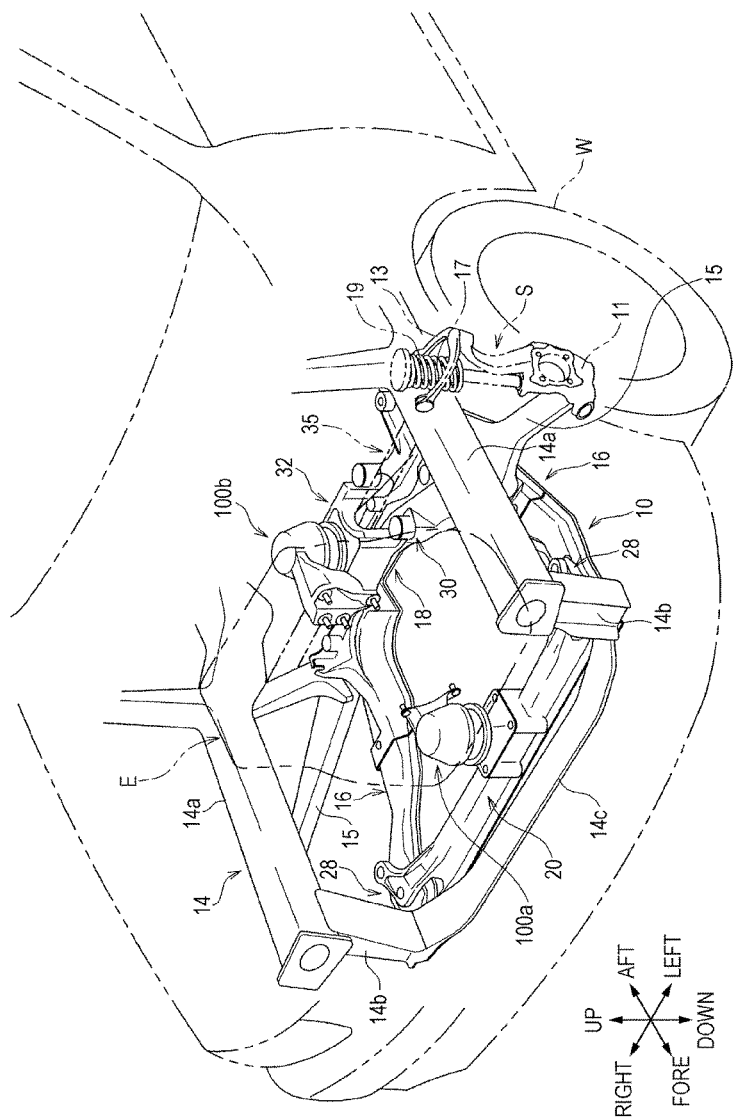
FIG. 1 is a cutaway perspective view illustrating a state where a subframe structure according to an embodiment of the present disclosure has been disposed in the front portion of an automobile.
Figure 2:
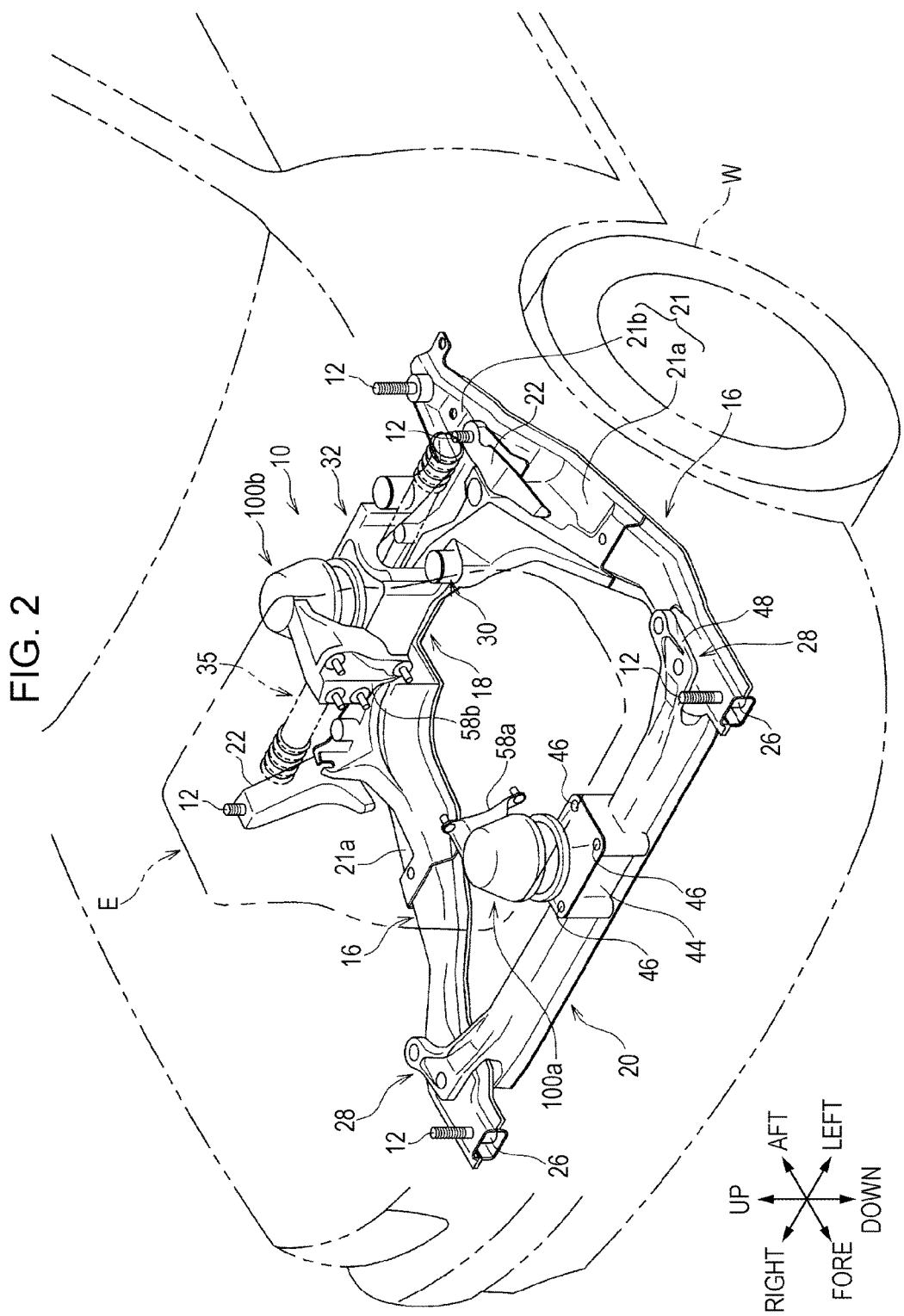
FIG. 2 is a cutaway perspective view of the subframe structure, where right and left front side frames and other components have been removed from the state illustrated in FIG. 1.
Figure 3:
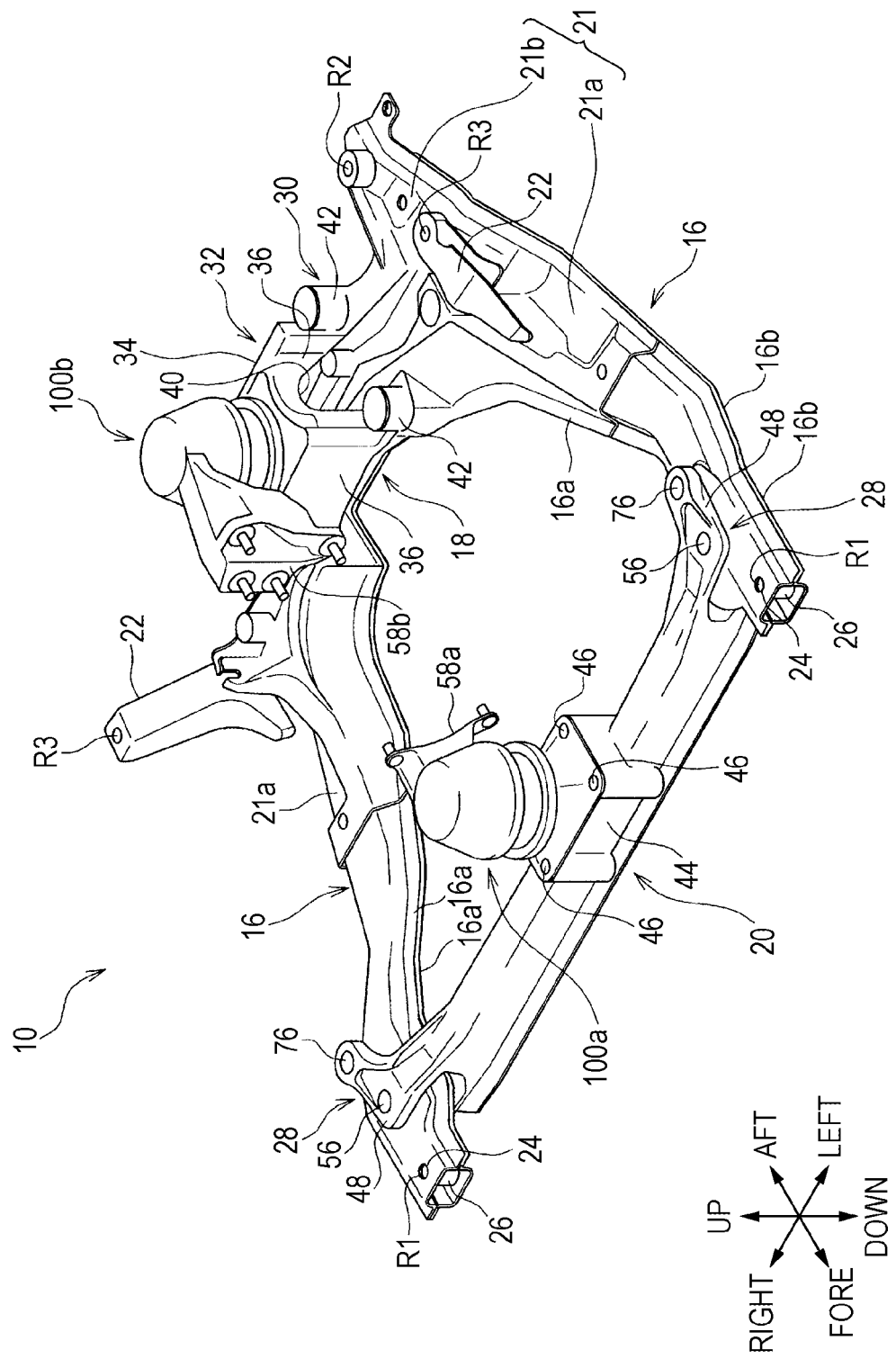
FIG. 3 is a perspective view of the subframe structure.
Figure 4:
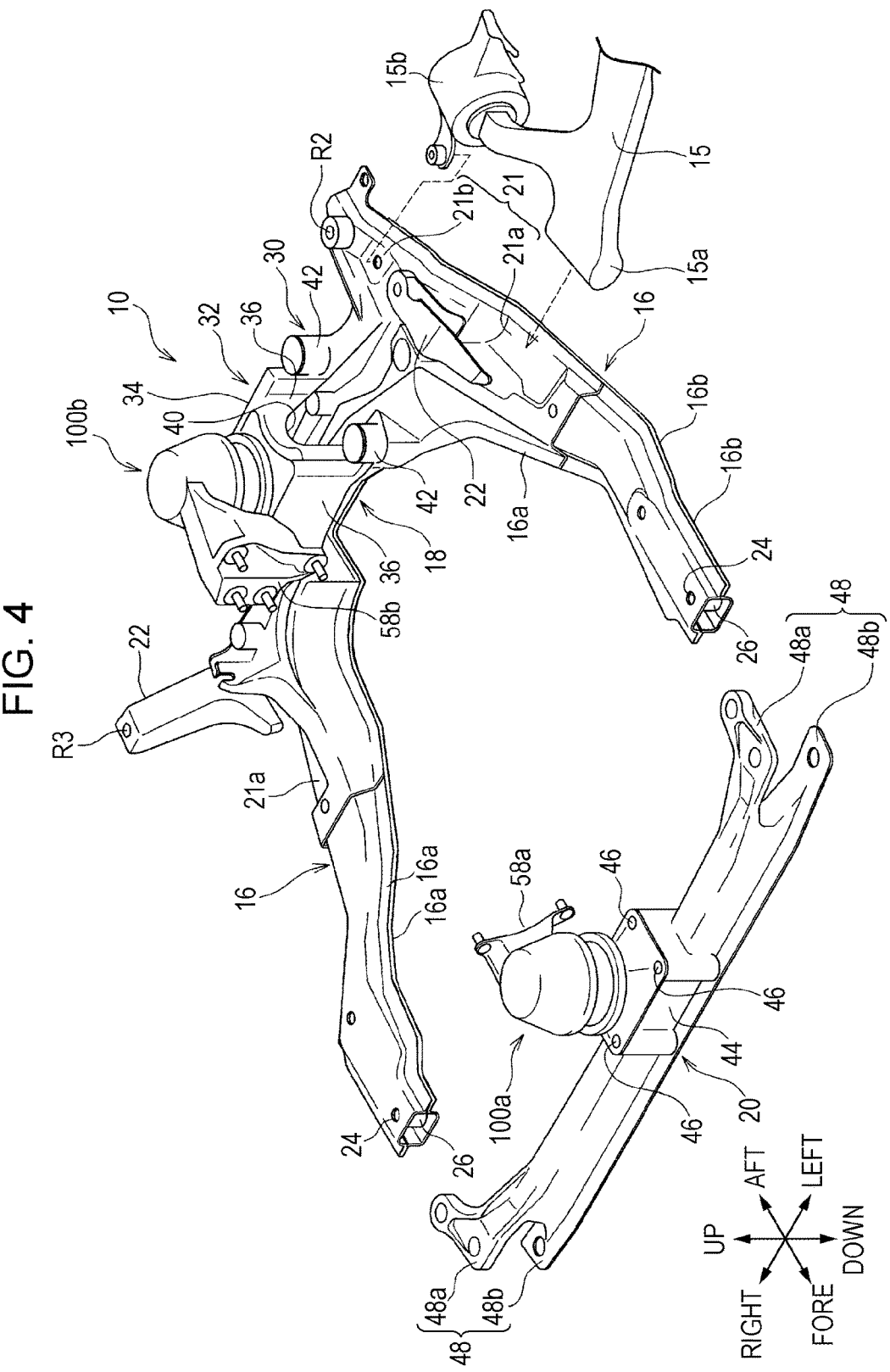
FIG. 4 is a disassembled perspective view of the subframe structure illustrated in FIG. 3.
Figure 6:
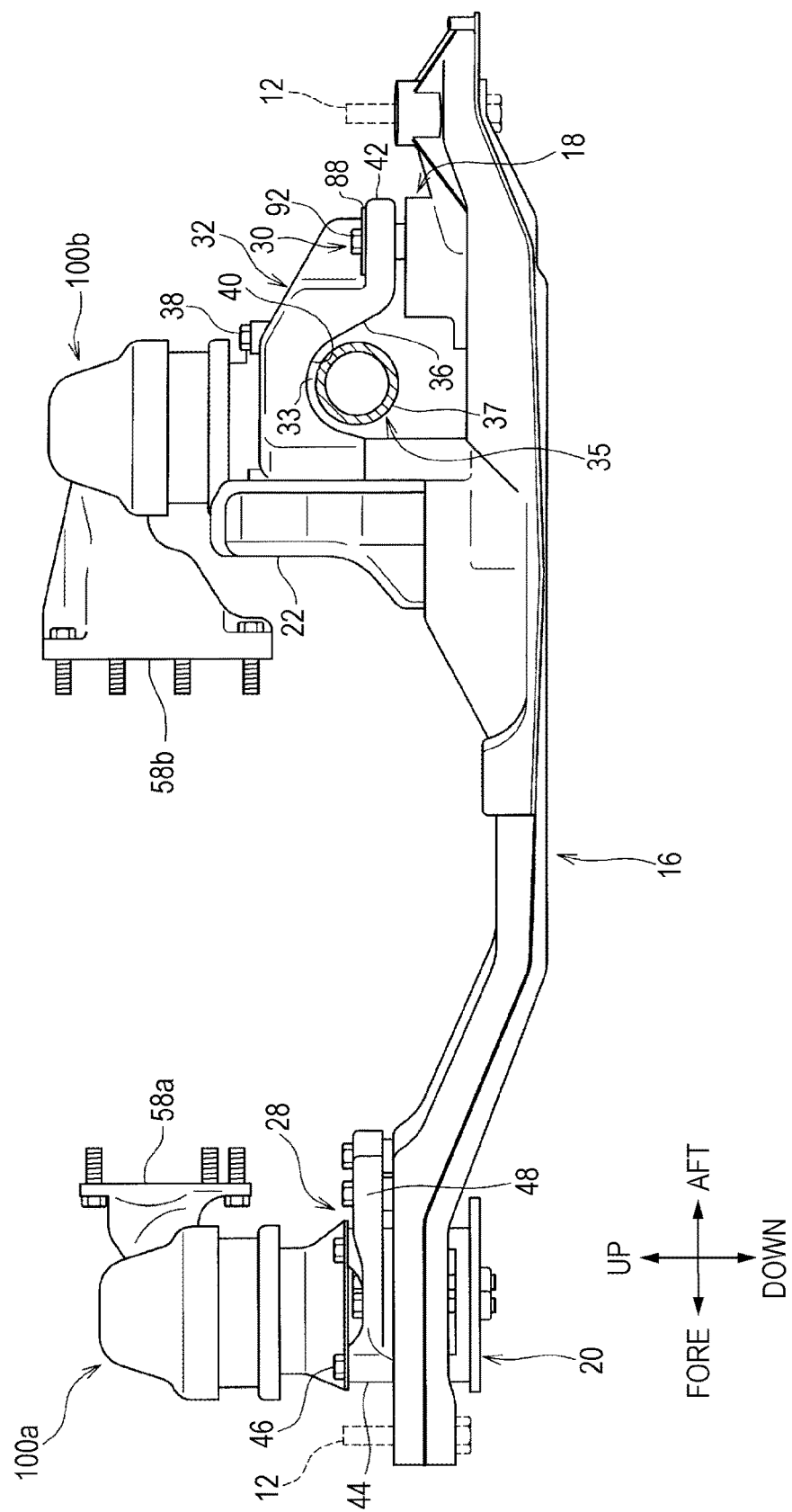
FIG. 6 is a side view of the subframe structure illustrated in FIG. 3.

An embodiment of the present disclosure will be described next with reference to the drawings. FIG. 1 is a cutaway perspective view illustrating a state where a subframe structure according to an embodiment of the present disclosure has been disposed in the front portion of an automobile. FIG. 2 is a cutaway perspective view of the subframe structure, where right and left front side frames and other components have been removed from the state illustrated in FIG. 1. FIG. 3 is a perspective view of the subframe structure. FIG. 4 is a disassembled perspective view of the subframe structure illustrated in FIG. 3. FIG. 5A is a planar view of the subframe structure illustrated in FIG. 3 and FIG. 5B is a planar schematic view illustrating the positional relation between a load input point IP and four support points SP. FIG. 6 is a side view of the subframe structure illustrated in FIG. 3. Note that the "fore", "aft", "up", and "down" indicated by the arrows in the diagrams represent the front-rear and up-down directions of the vehicle, and "right" and "left" represent the sideways (vehicle width) direction of the vehicle in a view from the driver's seat (width direction of the vehicle).

The subframe structure 10 according to the present embodiment is disposed at the front part of the vehicle, as illustrated in FIGS. 1 and 2, and is rigidly fixed to a body frame 14 by multiple bolts 12 protruding upwards in the vertical direction (see FIG. 2).

The body frame 14 includes a pair of right and left front side frames 14a extending in the fore and aft directions of the vehicle, a pair of right and left connecting frames 14b that connect the front part of the right and left front side frames 14a with the subframe structure 10 to the lower side thereof, and a front cross frame 14c connecting the pair of right and left connecting frames 14b to each other, as illustrated in FIG. 1.

Note that in FIG. 1, the reference symbol S represents a suspension mechanism. This suspension mechanism S includes a knuckle 11 that rotate supports a wheel W, an upper suspension arm 13 linked to the upper part of the knuckle 11, a lower suspension arm 15 linked to the lower part of the knuckle 11, a damper 17 that provides the vehicle with damping force, and a damper spring 19 that provides the vehicle with elastic force.

The subframe structure 10 includes a pair of right and left side members (longitudinal members) 16, a rear cross member (lateral member) 18, a front cross-beam 20 and lower suspension arms (or simply "suspension arms") 15 attached to each of the attachment portions 21 of the rear cross member 18 (see FIG. 1), as illustrated in FIG. 3.

The attachment portions 21 are provided to both ends of the rear cross member 18 in the width direction of the vehicle as illustrated in FIG. 5A. Each attachment portion 21 includes a front attachment portion 21a situated toward the front of the vehicle, and a back attachment portion 21b situated toward the back of the vehicle. The front attachment portion 21a is formed deeper as compared to the back attachment portion 21b as illustrated in FIG. 4, in the form of a recessed portion so as to accommodate a front tip protrusion 15a of the lower suspension arm 15. The back attachment portion 21b is formed as a rectangular recessed portion in planar view, to which a bushing 15b having a bracket is screwed, so as to turnably support a back end shaft portion of the lower suspension arm 15.

While the pair of right and left side members 16 and the rear cross member 18 are described as being integrally formed in the present embodiment, this is not restrictive. For example, both end portions of the rear cross member 18 in the axis direction may be welded to the back side (in the front-back direction of the vehicle) portions of the pair of right and left side members 16.

The pair of right and left side members 16 are formed from rigid hollow members, such as steel or the like, and are linearly symmetrical to each other. The side members 16 extend in the fore and aft directions of the vehicle, and situated at laterally right side and left side parts of the vehicle. Inner flanges 16a and outer flanges 16b are provided to the inner and outer sides of the side members 16, friction stir welding, for example, being used to join the vertically layered inner flanges 16a to each other and outer flanges 16b to each other.

The side members 16 each have multiple fixed points R for rigidly fixing the side members 16 to the body frame 14. There are a total of six fixed points R; a pair of first fixed points R1, one each being situated at the front end of each of the side members 16 toward the front of the vehicle, a pair of second fixed points R2, one each being situated at the back end of each of the side members 16 toward the back of the vehicle, and a pair of third fixed points R3, one each being situated at an upper end portion of a stay 22 attached at a middle portion of the side members 16 between the front and back of the vehicle (see the solid circles in FIG. 10 which will be described later).

Figure 7:
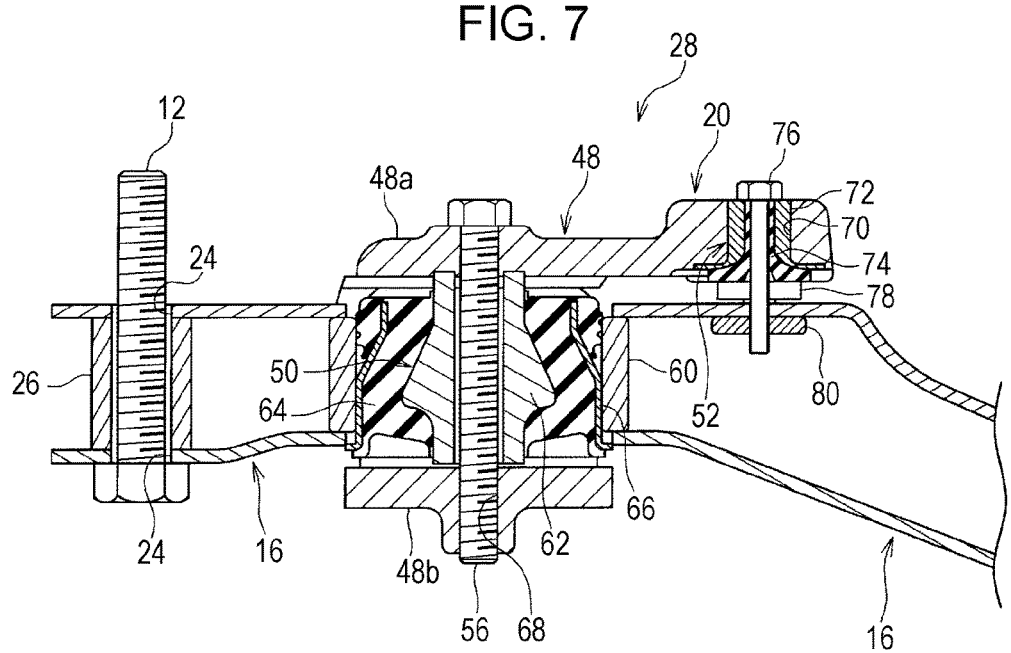
FIG. 7 is a longitude-sectional view taken along VII-VII in FIG. 5A.

The first fixed points R1 situated at the front end of each of the side members 16 toward the front of the vehicle are each configured as a bolt 12 which is a fixing mechanism, fastening holes 24 formed in the upper and lower walls through which the bolt 12 passes, and a cylindrical member 26 disposed connecting the upper wall and the lower wall, through which the bolt 12 passes, as illustrated in FIG. 7 which will be described later.

Note that the first through third fixed points R1 through R3 are fastening points already existing in subframes in the related art with no change made thereto. The positions and number of the first through third fixed points R1 through R3 are not restricted to the above description.

The rear cross member 18 extends in the width direction of the vehicle, and is integrally joined to the rear ends of the pair of right and left side members 16 toward the back of the vehicle. Floatably mounted around the middle portion of the rear cross member 18 in the lateral direction of the vehicle is an attachment bracket 32, via a second floating mechanism 30 (see FIG. 6).

Figure 8:
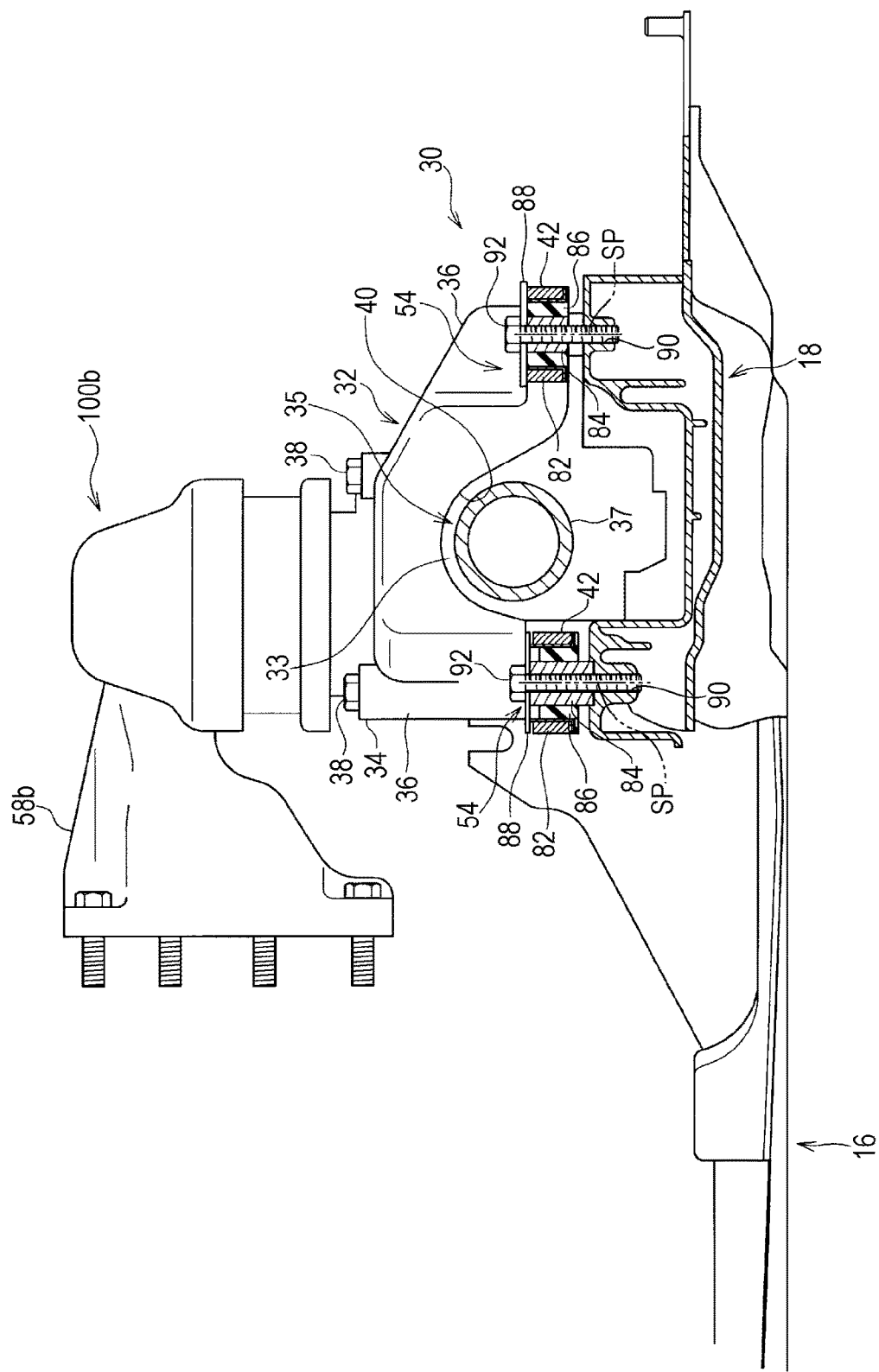
FIG. 8 is a longitude-sectional view taken along VIII-VIII in FIG. 5A.

The attachment bracket 32 is configured including a support fixation portion 34 and legs 36, as illustrated in FIG. 8. The support fixation portion 34 has a mounting face to which a later-described second vibration-isolation device 100b is mounted, the second vibration-isolation device 100b being supported by and fixed to the mounting face by bolts

38. The legs 36 continue downward from the support fixation portion 34, and is floatably attached to the upper face of the rear cross member 18. The legs 36 straddle, in the front-back direction of the vehicle, a center line C of the rear cross member 18 which extends in the width direction of the vehicle (see FIG. 5A) in planar view, and in side view is formed branching in the front-back direction of the vehicle over an accommodation recess 40 (see FIG. 6). Four ring members 42 are provided at the lower end of the legs 36, with elastic bushings (elastic members) 54 that each make up the later-described second floating mechanism 30 being fit within hole portions of the four ring members 42 (see FIG. 8).

A steering gearbox 35 is disposed in the accommodation recess 40 across a clearance 33 as illustrated in FIG. 8, extending in the width direction of the vehicle (see FIGS. 1 and 2). The steering gearbox 35 converts rotation of an unshown steering wheel into lateral movement in the width direction of the vehicle, and transmits this lateral movement to the wheels W. The steering gearbox 35 includes a generally cylindrical gear box main unit 37, and an unshown pinion shaft that transmits the rotations of the steering wheel to the steering gearbox 35.

Returning to FIGS. 2 and 3, the front cross-beam 20 extends in the width direction of the vehicle, and is floatably supported by the ends of the pair of right and left side members 16 at the front side of the vehicle, via a later-described first floating mechanism 28. The front cross-beam 20 is formed from a rigid hollow member, such as steel or the like, separately from the pair of right and left side members 16 and the rear cross member 18.

A mount portion 44 is provided on the upper face at the generally middle of the front cross-beam 20 in the width direction of the vehicle, protruding upwards to mount later-described first vibration-isolation device 100a. This mount portion 44 has a generally rectangular smooth face in planar view, and has four bolt holes (not illustrated) at the four corners thereof. The first vibration-isolation device 100a can be rigidly fixed to the front cross-beam 20 by passing the bolts 46 through those bolt holes and fastening the bolts 46.

Branch pieces 48, made up of an upper piece 48a and a lower piece 48b that branch vertically at the middle portion, are provided at both ends of the front cross-beam 20 in the width direction of the vehicle. Each branch piece 48 has faces facing one another, and grips the end of the side member 16 at the front side of the vehicle by being fastened by a later-described bushing fastening bolt 56.

The aforementioned first vibration-isolation device 100a that supports the side of an engine (power plant for the vehicle) E toward the front of the vehicle is mounted to the subframe structure 10 via an attachment bracket 58a. The aforementioned second vibration-isolation device 100b that supports the side of the engine E toward the back of the vehicle is mounted to the subframe structure 10 via an attachment bracket 58b. The first vibration-isolation device 100a is rigidly fixed to the mount portion 44 of the front cross-beam 20 by multiple bolts 46. The second vibration-isolation device 100b is floatably supported by the rear cross member 18 via the attachment bracket 32.

The first vibration-isolation device 100a and the second vibration-isolation device 100b both have the same structure, and are configured as active vibration-isolation devices that exhibit active or counteractive vibration offsetting effects as to vibrations to be isolated by vibration at a later-described driving unit 141. The configurations of the first vibration-isolation device 100a and second vibration-isolation device 100b will be described in detail later.

The first floating mechanism 28 is provided at the positions on both ends of the front cross-beam 20 in the width direction of the vehicle, where the branch pieces 48 of the front cross-beam 20 grip the end of the side members 16 at the front side of the vehicle, as illustrated in FIG. 7. This first floating mechanism 28 performs floating support with the front cross-beam 20 and first vibration-isolation device 100a as the mass component thereof.

The first floating mechanism 28 is configured including a first bushing 50 and a second bushing 52 that are disposed separated by a predetermined interval in the generally front-back direction of the vehicle. The first bushing 50 and second bushing 52 function as floating points F1 and F2, which will be described later (see FIG. 10).

The first bushing 50 is disposed within a cylindrical member 60 that connects the upper wall and lower wall of the side members 16. The first bushing 50 includes a metal inner tube 62, a generally cylindrical rubber first elastic member 64 attached to the outer circumferential face of the inner tube 62 by vulcanization adhesion, a metal outer tube 66 of which a part covers the outer circumferential face of the first elastic member 64 and the remainder is embedded within the first elastic member 64, and a long bushing fastening bolt 56 that passes through the branch pieces 48 of the front cross-beam 20 and the inner tube 62 is fastened to a screw hole 68 formed in the lower piece 48b of the branch pieces 48. Note that the outer tube 66 may be replaced by a leaf spring.

The second bushing 52 includes an outer tube 72 fitted in a through hole 70 formed in the upper piece 48a of the branch pieces 48 of the front cross-beam 20, a second elastic member 74 formed as a thin and generally cylinder member that has a smaller diameter than the first elastic member 64, a disc-shaped seating face 78 interposed between the lower face (stopper face) of the second elastic member 74 below the upper piece 48a and the upper face of the upper wall of the side members 16, and a short bushing fastening bolt 76 passing through the second elastic member 74 and fastened to a disc-shaped member 80 provided on the upper wall of the side members 16.

Note that as illustrated in FIG. 5A, an imaginary line A connecting the centers of the bushing fastening bolts 56 of the first bushings 50 provided to the pair of right and left side members 16 is offset towards the back of the vehicle by a predetermined distance D, as compared to an imaginary line B connecting the first fixed points R1 of rigid fixation to the body frame 14. Offsetting toward the back of the vehicle by the predetermined distance D in this way enables the first floating mechanism 28 to be easily disposed without changing the conventional fixed points as to the body frame. The imaginary line A connecting the centers of the bushing fastening bolts 56 of the first bushings 50 matches the center line of the front cross-beam 20.

The second floating mechanism 30 is attached to the part where the legs 36 of the attachment bracket 32 supporting the second vibration-isolation device 100b are attached to the rear cross member 18, at the generally middle portion of the rear cross member 18 in the width direction of the vehicle. The second floating mechanism 30 performs floating support with the second vibration-isolation device 100b and the attachment bracket 32 as the mass component thereof.

The second floating mechanism 30 is configured including the four elastic bushings 54, each of the same structure, that are fit into the holes of the four ring members 42 of the legs 36. These four elastic bushings 54 function as the floating points F3, as described later. The center axes of the four elastic bushings 54 serve as the multiple support points SP and floatably support the attachment bracket 32 on the rear cross member 18 which is a lateral member (see FIG. 8). While a case where the number of multiple support points SP is four is exemplarily illustrated, this is not restrictive; an arrangement where multiple support points SP are provided is sufficient.

As illustrated in FIG. 8, the elastic bushing 54 includes an outer tube 82 and inner tube 84, a cylindrical bushing 86 interposed between the outer tube 82 and the inner tube 84 and attached to the both inner circumferential face of the outer tube 82 and the outer circumferential face of the inner tube 84 by vulcanization adhesion, a disc-shaped seating 88 provided on the upper face of the ring member 42, and a bushing fastening bolt 92 that passes through the disc-shaped seating 88 and inner tube 84 and is fastened to a screw hole 90 formed in the inner wall of the rear cross member 18.

Figure 9:
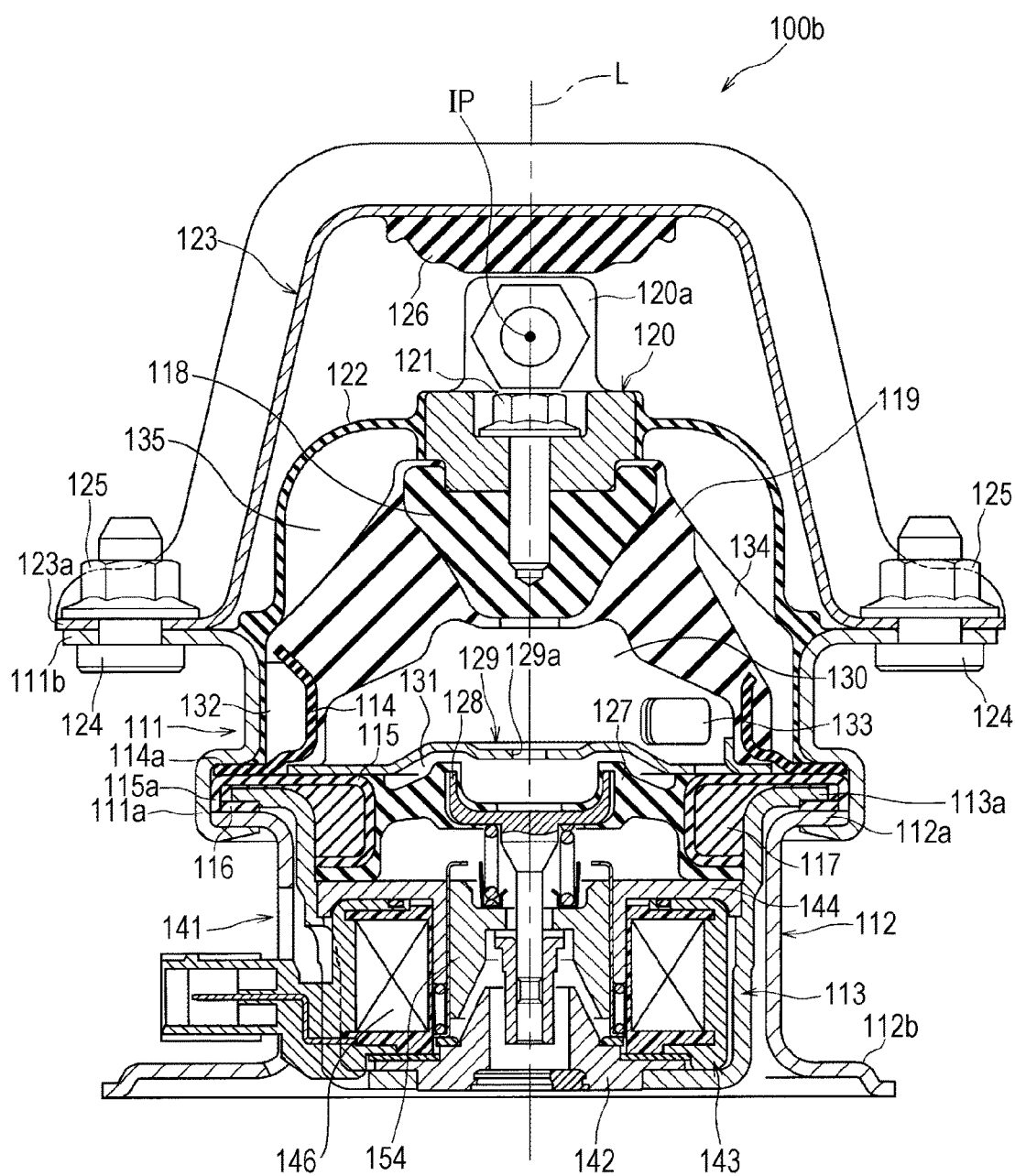
FIG. 9 is a longitude-sectional view illustrating a schematic configuration of a second vibration-isolation device mounted to the subframe structure illustrated in FIG. 3.

Next, the structure and operations of the vibration-isolation devices will be described. FIG. 9 is a longitude-sectional view illustrating a schematic configuration of the second vibration-isolation device 100b mounted on the subframe structure 10 illustrated in FIG. 3. The first vibration-isolation device 100a and the second vibration-isolation device 100b have the same structure regarding the portion above the mount portion 44 and attachment bracket 32, so the structure of the second vibration-isolation device 100b will be described in detail, and description of the first vibration-isolation device 100a will be omitted. Although liquid-sealed type vibration-isolation devices are used for the second vibration-isolation device 100b here, this is not restrictive. Also, while an active vibration-isolation device is preferred, this is not restrictive, either.

The second vibration-isolation device 100b has a substantially axially symmetrical structure as to an axial line L, as illustrated in FIG. 9. The second vibration-isolation device 100b includes a generally cylindrical upper housing 111, a generally cylindrical lower housing 112 disposed beneath the upper housing 111, a generally cup-shaped actuator case 113 which is accommodated within the lower housing 112 hand has the upper face thereof opened, a diaphragm 122 connected to the upper side of the upper housing 111, a first rubber supporting ring 114 accommodated within the upper housing 111, a first rubber 119 connected to the upper side of the first rubber supporting ring 114, a second rubber supporting ring 115 accommodated within the actuator case 113, a second rubber 127 connected on the inner peripheral side of the second rubber supporting ring 115, a driving unit (actuator) 141 disposed below the second rubber supporting ring 115 and second rubber 127 accommodated within the actuator case 113, and so forth.

The second rubber supporting ring 115 has upper and lower outer circumferential portions disposed at the upper portion within the actuator case 113, that have an annular cross-section generally in the shape of a box with one side open. A flange 113a on the outer perimeter of the actuator case 113, an outer circumferential portion 114a of the first rubber supporting ring 114, and an upper face outer circumferential portion 115a of the second rubber supporting ring 115, are layered between a flange 111a at the lower edge of the upper housing 111 and a flange 112a at the upper edge of the lower housing 112, and joined by crimping.

The actuator case 113 is floatably supported so as to be vertically movable relative to the upper housing 111 and the lower housing 112, by interposing a first floating rubber 116 between the flange 112a and the flange 113a, and an annular second floating rubber 117 between the upper face of the flange 113a and the lower face of the upper face outer circumferential portion 115a of the second rubber supporting ring 115.

The first rubber supporting ring 114 and a first rubber support boss 118 disposed within a recess provided to the upper face side of the first rubber 119 are joined by vulcanization adhesion at the lower edge and upper edge of the first rubber 119 formed of a thick rubber material. A diaphragm support boss 120 is fixed by a bolt member 121 at the upper face of the first rubber support boss 118, and the outer circumferential portion of the diaphragm 122 joined by vulcanization adhesion at the inner circumferential portion thereof to the diaphragm support boss 120 is joined to the upper housing 111 by vulcanization adhesion.

An engine mount 120a is integrally formed on the upper face of the diaphragm support boss 120, and is fixed to the engine side. A body side attachment portion 112b at the lower edge of the lower housing 112 is fixed to the front cross-beam 20. At the second vibration-isolation device 100b, the body side attachment portion 112b at the lower edge of the lower housing 112 is fixed to the attachment bracket 32.

A load input point IP where load is input from the engine E to the second vibration-isolation device 100b is provided at the center of the engine mount 120a on the axial line L. This load input point IP is situated within a region G surrounded by the four support points SP in planar view, as illustrated in FIGS. 5B and 5A. The operational effect relating to the positional relationship between the load input point IP and the four support points SP will be described in detail later.

A flange 111b at the upper edge of the upper housing 111 is fastened to a flange 123a at the lower edge of a stopper member 123 by bolts 124 and nuts 125. The engine mount 120a erected on the upper face of the diaphragm support boss 120 faces a stopper rubber 126 attached to the upper inner face of the stopper member 123, so as to be capable of abutting.

The outer circumferential portion of the second rubber 127 that has been formed of film-shaped rubber is bonded to the inner circumferential face of the second rubber supporting ring 115 by vulcanization adhesion, and a movable member 128 is bonded by vulcanization adhesion to the middle portion of the second rubber 127 with the upper portion thereof embedded therein.

A disc-shaped partition member 129 is fixed between the upper face of the second rubber supporting ring 115 and the lower portion of the first rubber supporting ring 114. A first liquid chamber 130 defined by the first rubber supporting ring 114, first rubber 119, and partition member 129, and a second liquid chamber 131 defined by the partition member 129 and the second rubber 127, communicate via a communication orifice 129a formed at the middle of the partition member 129.

An annular communication path 132 is formed between the first rubber supporting ring 114 and the upper housing 111. The communication path 132 communicates with the first liquid chamber 130 via a communication orifice 133, and communicates with a third liquid chamber 135 defined by the first rubber 119 and diaphragm 122, by an annular communication gap 134.

The driving unit 141 is configured including a stator 142 primarily formed of a metal or alloy having high permeability, a coil assembly 143 including coils 146, a yoke 144, an armature 154, and so forth. Upon electric power being supplied to the coils 146 of the driving unit 141 so as to be excited, the armature 154 is drawn and the movable member 128 is moved downwards. This movement of the movable member 128 causes downward deformation of the second rubber 127 defining the second liquid chamber 131, so the volume of the second liquid chamber 131 increases. The increase of volume of the second liquid chamber 131 causes an incompressible fluid within the first liquid chamber 130 that has been compressed by the pressing load from the engine E side to flow into the second liquid chamber 131 via the communication orifice 129a. Consequently, the lead transmitted from the engine E side to the body side (cabin side) can be reduced.

On the other hand, demagnetizing the coils 146 causes the second rubber 127 to deform upwards due to the elastic force thereof, the movable member 128 and armature 154 move upwards, and the volume of the second liquid chamber 131 decreases. Upon the volume of the second liquid chamber 131 decreasing, the incompressible fluid within the second liquid chamber 131 flows into the first liquid chamber 130 that has been decompressed by the pulling lead from the engine E side, via the communication orifice 129a. Consequently, the lead transmitted from the engine E side to the body side (cabin side) can be reduced.

As described above, the first vibration-isolation device 100a and second vibration-isolation device 100b each function as active vibration-isolation devices. Excitation force from displacement driving of the driving unit 141 acts upon the incompressible fluid sealed in the first liquid chamber 130, whereby vibrations input via the engine E are actively or counteractively reduced.

The subframe structure 10 according to the present embodiment is basically configured as described above. Operational effects thereof will be described below.

According to the present embodiment, the multiple support points SP are positioned apart from one another along typically one planer region between the upper portion of the rear cross member 18 and the bottom portion of the attachment bracket 32 so that they are allocated at the different positions, thereby forming the region G defined by the multiple support points SP (see FIG. 5B). Even though the subframe structure 10 is rigidly connected to the body frame 14 by bolts 12 (see FIG. 2), the vibration from the engine E to the frame structures is effectively absorbed because the load input point IP is situated within the region G (indicated in FIG. 5B by halftone dots) surrounded by multiple (four exemplarily illustrated in the present embodiment) support points SP in planar view of the region G (the plane) as shown in FIG. 5B. In such a placement configuration, excessive vibrations in the longitude direction of the vehicle that are input from the load input point IP, and excessive vibrations in the lateral direction of the vehicle, are absorbed at the support points SP. Accordingly, vibrations in the longitude direction of the vehicle and excessive vibrations in the lateral direction of the vehicle are kept from being added to the vibrations in the vertical direction of the vehicle input from the load input point IP. Accordingly, the vibration-shielding region by the second vibration-isolation device 100b can be extended in the present embodiment, and vibration isolation effects can be improved over the related art even further. As a result, the present embodiment can effectively reduce vibrations from the engine E.

On the other hand, in a case where the load input point IP is situated outside of a region G surrounded by the support points SP, excessive vibrations in the longitude direction of the vehicle and excessive vibrations in the lateral direction of the vehicle are added to the vibrations in the vertical direction of the vehicle input from the load input point IP, so extending the vibration-shielding region by the second vibration-isolation device 100b is difficult.

Further, according to the present embodiment, setting the linear distance from the load input point IP within the region G to the four support points SP to be generally the same enables the four elastic bushings 54 disposed at each of the four support points SP to generally uniformly exhibit vibration isolating effects.

Also, the steering gearbox 35 can be suitably disposed within the accommodation recess 40 formed in the attachment bracket 32 in the present embodiment (see FIG. 8). As a result, the scant space at the front of the vehicle where the engine E is accommodated can be used efficiently, and freedom of layout within the space can be improved.

Further, the attachment portions 21 are provided to both ends of the rear cross member 18 in the width direction of the vehicle in the present embodiment, thus making for space to attach the lower suspension arms 15. Making the depth of the recesses of the front attachment portions 21a to be lower than the recesses of the back attachment portions 21b suitably avoids the front tip protrusion 15a accommodated in the front attachment portion 21a from protruding upwards from the upper face of the rear cross member 18. As a result, freedom of layout within the space where the engine E is accommodated can be improved even further.

FIG. 10 is a planar schematic diagram illustrating the placement relationship between the fixed points and floating points of the subframe structure 10 illustrated in FIG. 3. As illustrated in FIG. 10, the subframe structure 10 according to the present embodiment has the first through third fixed points R1 through R3 (on either side for a total of six), that rigidly fix the subframe structure 10 as to the right and left front side frames 14a, positioned with a predetermined amount of distance between each in the front-back direction of the vehicle, on the right and left side members 16 which are longitudinal members. Also, the four floating points F1 and F2 that providing floating support of the front cross-beam 20 are provided by the first elastic members 64 of the first bushings 50 and the second elastic members 74 of the second bushings 52, making up the first floating mechanism 28. Moreover, four floating points F3 are provided, that provide floating support of the attachment bracket 32 and second vibration-isolation device 100b, by the cylindrical bushings 86 of the four elastic bushings 54 making up the second floating mechanism 30.

That is to say, at the side of the subframe structure 10 according to the present embodiment toward the front of the vehicle, vibrations input via the engine E are actively or counteractively reduced by the first vibration-isolation device 100a fixed to the front cross-beam 20. Also, the first floating mechanisms 28 having the first bushings 50 and second bushings 52 are provided to the side members 16, to perform floating support of the front cross-beam 20. Consequently, the vibration isolation functions of the first vibration-isolation device 100a and the vibration isolation functions of the first floating mechanism 28 act cooperatively, so that double vibration reduction effects (effects of reducing the ability of the vibrations to be transmitted) are yielded at the side of the subframe structure 10 toward the front of the vehicle.

Additionally, at the side of the subframe structure 10 according to the present embodiment toward the back of the vehicle, vibrations input via the engine E are actively or counteractively reduced by the second vibration-isolation device 100b provided to the rear cross member 18 via the attachment bracket 32. Also, the second floating mechanism 30 is provided disposed between the attachment bracket 32 and the rear cross member 18, having the elastic bushings 54 that perform floating support of the attachment bracket 32 and the second vibration-isolation device 100b. Consequently, the vibration reduction effects (effects of reducing the ability of the vibrations to be transmitted) of the second vibration-isolation device 100b and the vibration reduction effects (effects of reducing the ability of the vibrations to be transmitted) of the second floating mechanism 30 act cooperatively, so that double vibration reduction effects (effects of reducing the ability of the vibrations to be transmitted) are yielded at the side of the subframe structure 10 toward the back of the vehicle. Thus, according to the present embodiment, double vibration reduction effects to reduce vibrations input via the engine E act cooperatively can be yielded over the entire subframe structure in the front-back direction of the vehicle.

Figure 11:
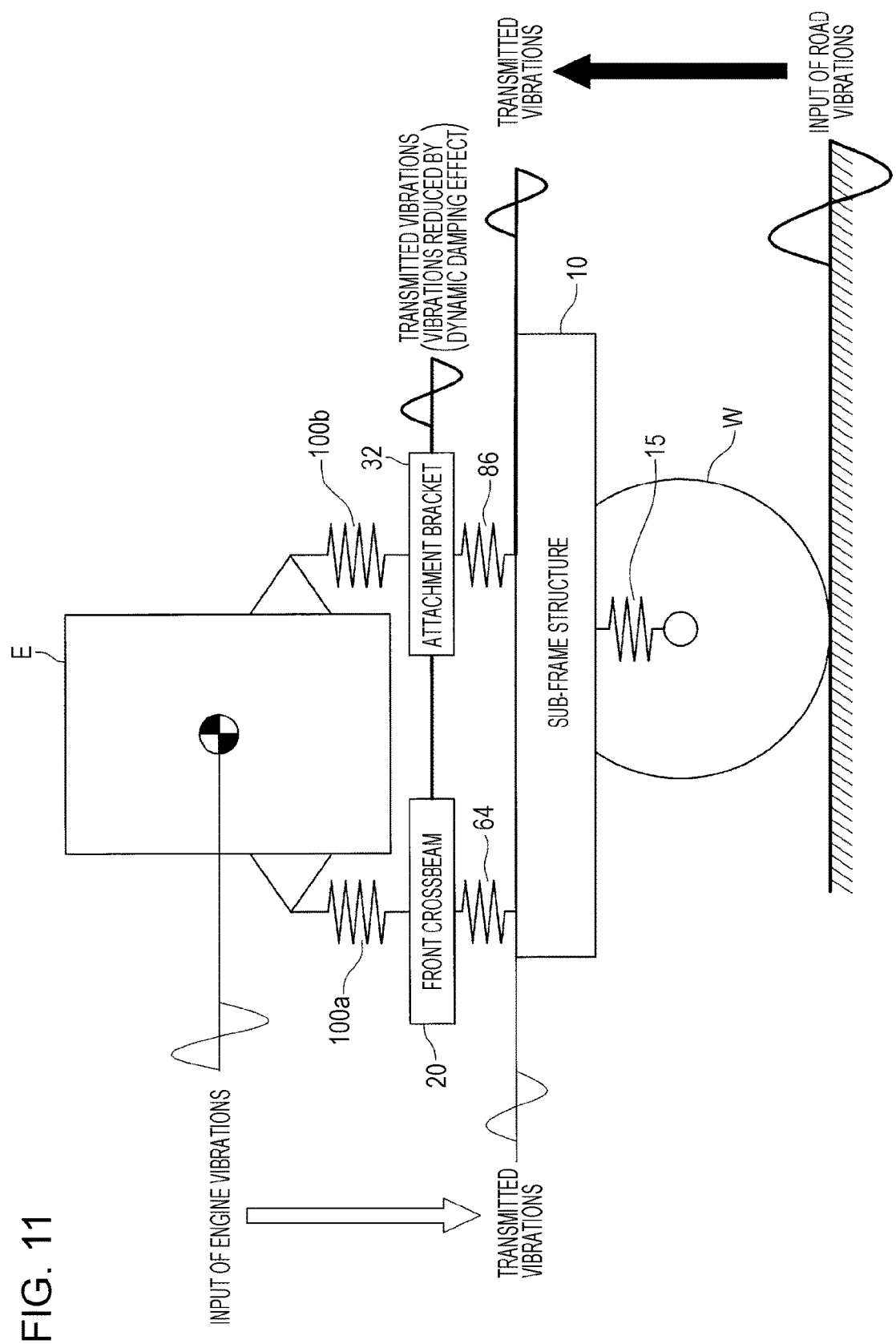
FIG. 11 is a schematic diagram for description of the dynamic damping effect.
Figure 12:
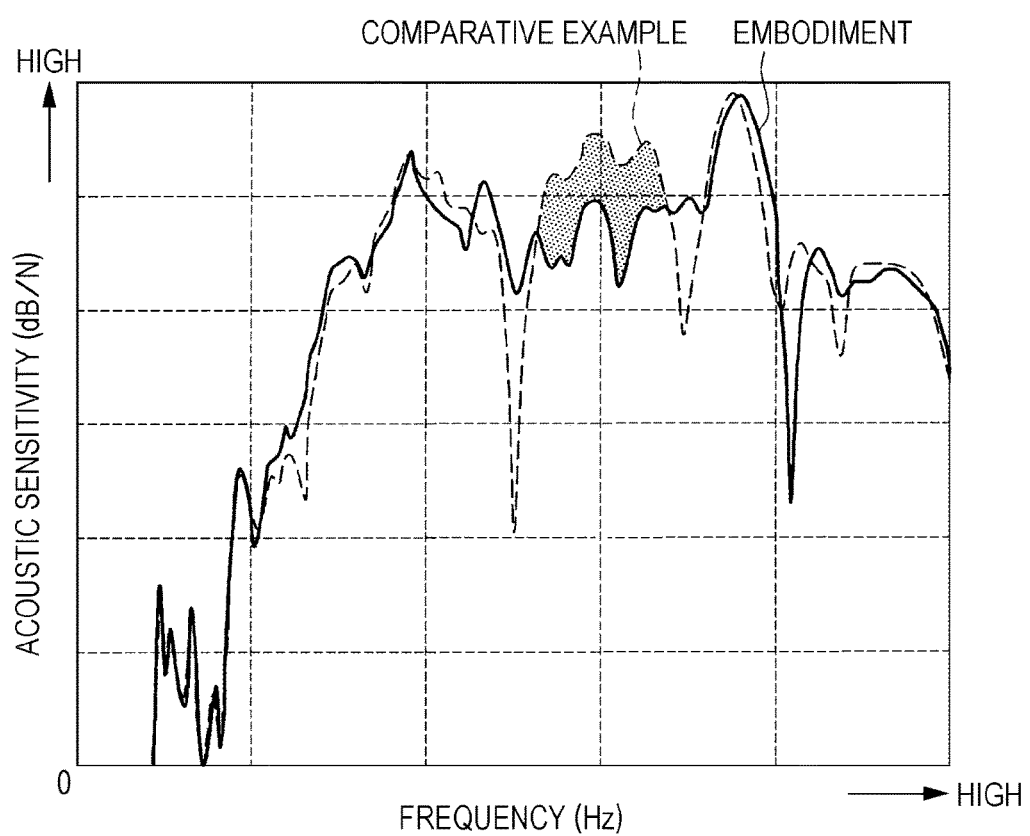
FIG. 12 is a properties graph illustrating the relationship between frequency and acoustic sensitivity.
Figure 13:
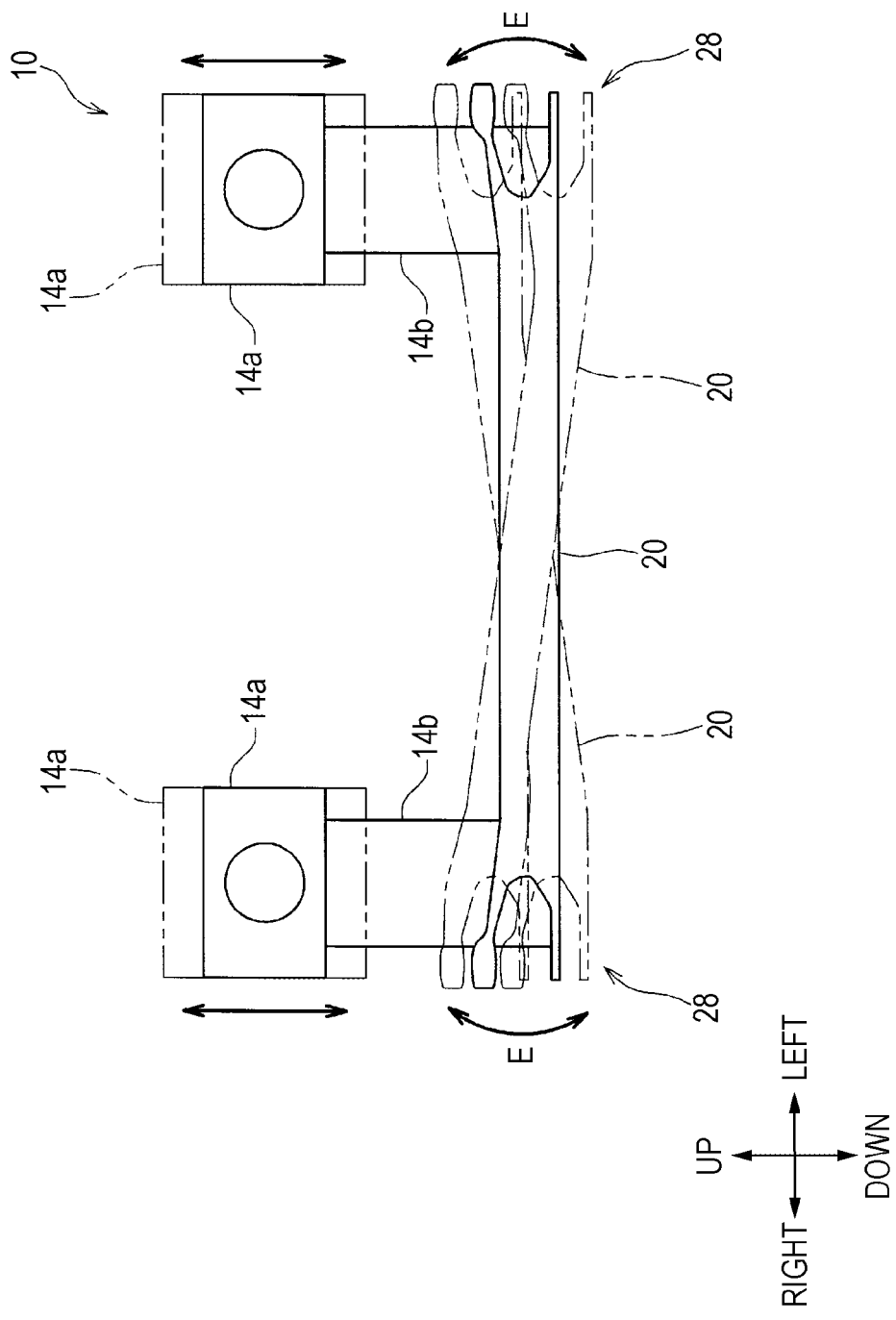
FIG. 13 is a frontal view illustrating a front cross-beam turning in the roll direction of the vehicle, in conjunction with elastic resonance of the right and left front side frames.
Figure 14:
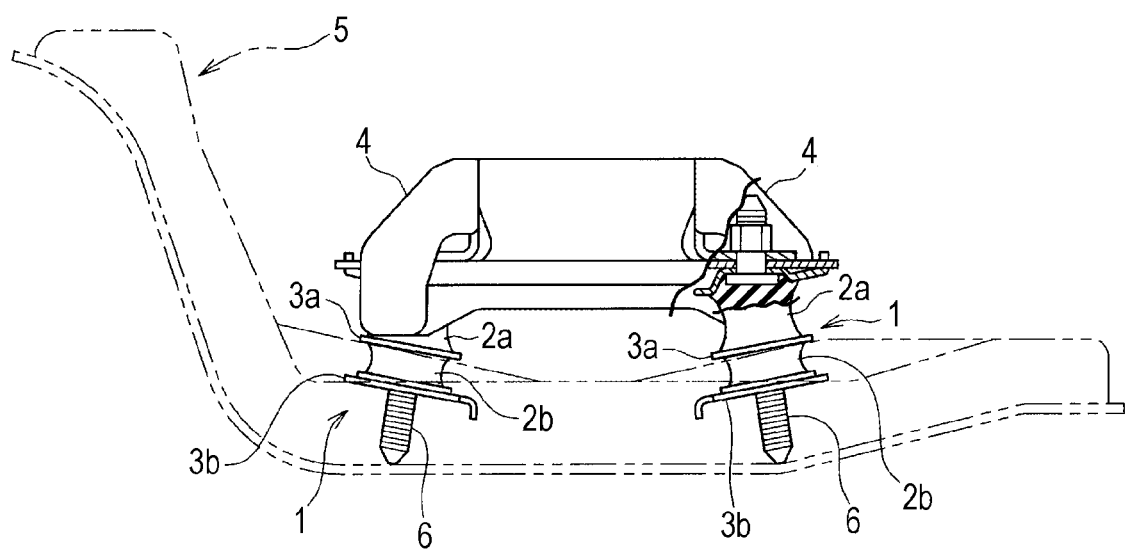
FIG. 14 is a cross-sectional view illustrating a vibration-absorbing elastic member disclosed in Japanese Unexamined Patent Application Publication No. 2000-238545.

Next, dynamic damping effects of the subframe structure 10 will be described. FIG. 11 is a schematic diagram for description of the dynamic damping effect. FIG. 12 is a properties graph illustrating the relationship between frequency and acoustic sensitivity. FIG. 13 is a frontal view illustrating a front cross-beam turning in the roll direction of the vehicle, in conjunction with elastic resonance of the right and left front side frames.

A wheel W in contact with a contact face is elastic supported by the lower suspension arm 15 disposed below the subframe structure 10, as illustrated in FIG. 11. The subframe structure 10 also includes the first vibration-isolation device 100a and first elastic members 64 that are disposed on the front cross-beam 20 and perform floating support of the engine E, and the second vibration-isolation device 100b and cylindrical bushings 86 that are disposed on the attachment bracket 32 of the rear cross member 18 and perform floating support of the engine E.

When the engine E is run, vibrations generated by the engine E are transmitted to the subframe structure 10, and double vibration reduction effects are provided by the first vibration-isolation device 100a, first elastic members 64, second vibration-isolation device 100b, and cylindrical bushings 86, provided to the subframe structure 10, in the configuration illustrated in FIG. 11. On the other hand, road vibrations input from the contact face of the wheel W (road surface) are transmitted to the subframe structure 10 via the wheel W and lower suspension arm 15.

In this vibration transmission structure, floating support is performed by the first elastic members 64 with the front cross-beam 20 and first vibration-isolation device 100a as the mass component thereof, and floating support is performed by the cylindrical bushings 86 with the second vibration-isolation device 100b and the attachment bracket 32 as the mass component thereof, exhibiting resonant vibrations at the engine E. The resonant vibrations of the engine E absorb the vibration energy at the resonant frequency range of road vibrations input to the subframe structure 10 by the lower suspension arm 15, thereby reducing road vibrations.

The subframe structure 10 that has the first vibration-isolation device 100a, front cross-beam 20, first elastic members 64, second vibration-isolation device 100b, attachment bracket 32, and cylindrical bushing 86, in the present embodiment, functions as a so-called dynamic damper, and can reduce road vibrations of particular frequencies at a resonant frequency range (vicinity of resonant frequency) input via the lower suspension arm 15.

In the properties relationship between frequency (Hz) and acoustic sensitivity (dB/N) illustrated in FIG. 12, the dotted line represents a properties curve of a subframe structure according to a comparative example, where the first and second floating mechanisms 28 and 30 have not been provided at is rigidly fixed to the body frame 14. The solid line represents a properties curve of the subframe structure 10 according to the present embodiment. It can be seen that the acoustic sensitivity in the resonant frequency region (the portion indicated by halftone dots in FIG. 12) is reduced as compared to the comparative example, thus functioning as a dynamic damper.

As one example thereof, the pair of right and left front side frames 14a that function as longitudinal members exhibit elastic resonance in the vertical direction as illustrated in FIG. 13, due to road vibrations input via the lower suspension arms 15. The front cross-beam 20 floatingly supported by the first floating mechanism 28 functioning as a front lateral member resonances in inverse phase to the elastic resonance of the right and left front side frames 14a, in the roll direction of the vehicle (direction indicated by the arrows E in FIG. 13). As a result, the road vibrations input from the lower suspension arms 15 to the subframe structure 10 are cancelled out by the front cross-beam 20 resonating in inverse phase in the roll direction of the vehicle, and thus are reduced even further.

The front cross-beam 20 on which the first vibration-isolation device 100a is mounted is floatably supported via the first bushings 50 and second bushings 52 having the first elastic members 64 and the second elastic members 74 in the present embodiment, whereby vibration reducing effects equal to or greater than floating support of the entire subframe as to the body frame 14. Also, the present embodiment is configured by a simple structure where the front cross-beam 20 configured as a separate member is attached in the lateral direction of the vehicle as to the edges of the right and left side members 16 at the front side of the vehicle in the present embodiment, so an existing subframe structure can be easily used. Moreover, the spring force of the multiple first bushings 50 and the spring force of the second bushings 52 can be each set so as to be different, for example, and the spring force of the first bushings 50 and the second bushings 52 can be each be adjusted in the present embodiment.

What is claimed is:

1. A subframe structure for a vehicle, comprising:
a longitudinal member extending in a front-rear direction of the vehicle and a lateral member extending in a vehicle width direction, which are supported by a body frame of the vehicle;
a vibration-isolation device attached to a vehicular power plant of the vehicle and disposed on the lateral member to support the vehicular power plant in a vibration isolation manner, the vibration-isolation device having a load input point via which a vibration from the vehicular power plant is input to the vibration-isolation device; and
an attachment bracket for the vibration-isolation device, that is attached to the vibration-isolation device, and that is attached to the lateral member via a plurality of elastic members such that the lateral member floatably supports the attachment bracket and the vibration-isolation device, the plurality of elastic members being allocated at a plurality of support points which define a region surrounded by the plurality of support points,
wherein the load input point from the vehicular power plant to the vibration-isolation device is positioned within said region in planar view of thereof.

2. The subframe structure according to claim 1, wherein the attachment bracket has a recess that allows a steering gearbox to be disposed therethrough and between the attachment bracket and the lateral member.

3. The subframe structure according to claim 1, further comprising suspension arms which are attached attachment portions which are provided on both ends of the lateral member in the vehicle width direction.

\* \* \* \* \*